C. LUKASIEWICZ.
NECK YOKE CENTER.
APPLICATION FILED APR. 14, 1908.
901,542.
Patented Oct. 20, 1908.
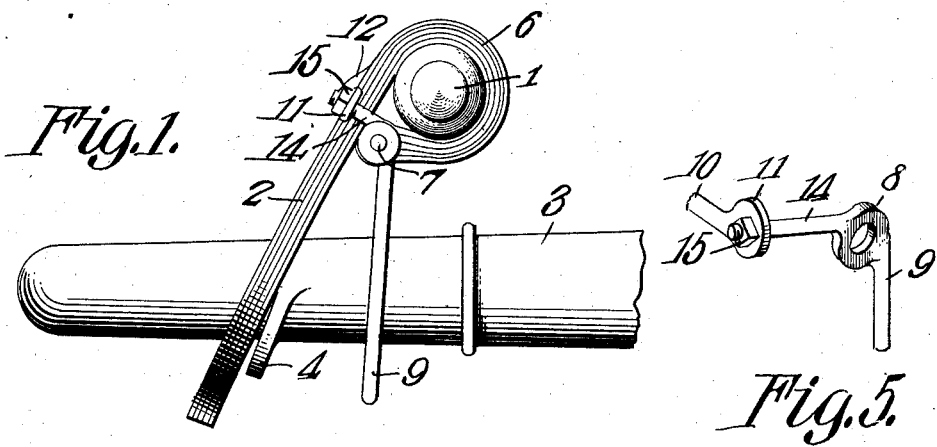
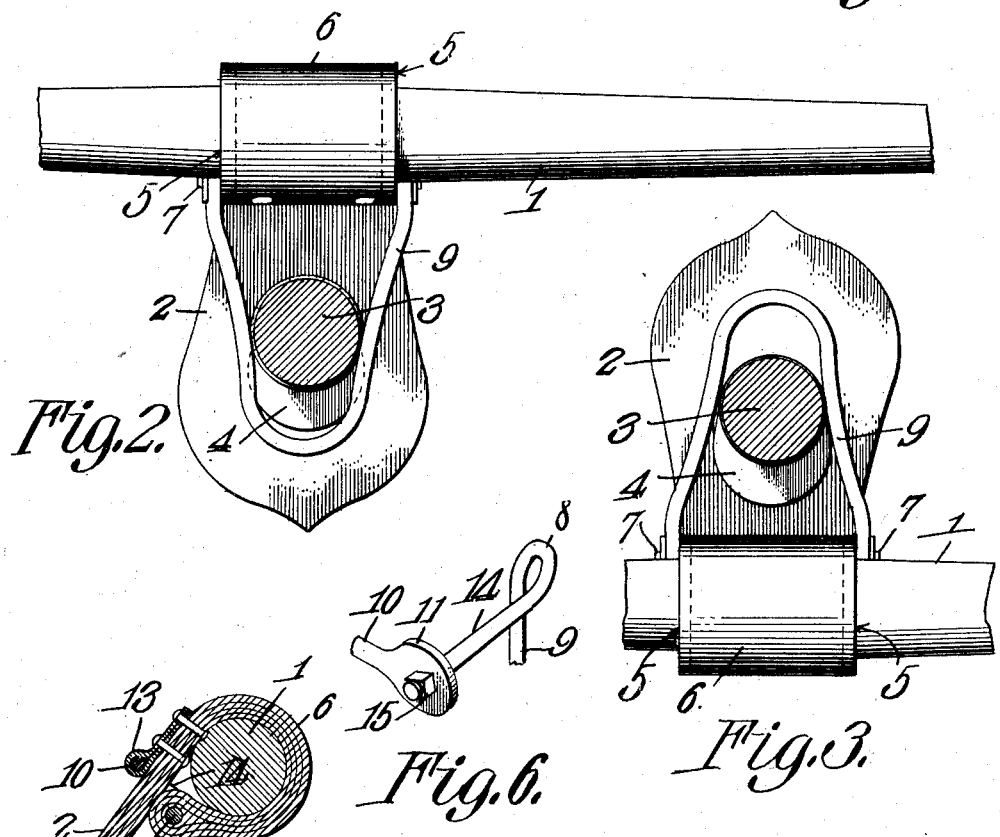
Witnesses
Charles Lukasiewicz, Inventor
By C. A. Snow & Co.
Attorneys

UNITED STATES PATENT OFFICE.

CHARLES LUKASIEWICZ, OF FARWELL, NEBRASKA.

NECK-YOKE CENTER.

No. 901,542.  Specification of Letters Patent.  Patented Oct. 20, 1908.

Application filed April 14, 1908. Serial No. 427,021.

*To all whom it may concern:*

Be it known that I, CHARLES LUKASIEWICZ, a citizen of the United States, residing at Farwell, in the county of Howard and State of Nebraska, have invented a new and useful Neck-Yoke Center, of which the following is a specification.

This invention relates to improvements in neck-yoke centers, and has for its object to provide a strong neat and safe connection between the tongue or pole of a vehicle and the neck-yoke which latter cannot slip nor fall off, nor be withdrawn from the pole or tongue while in use.

With this as the main object and having other objects in view the invention consists of the novel construction, combination and arrangement of parts hereinafter described and claimed and illustrated in the accompanying drawing in which, Figure 1, is a view in side elevation of the improved neck-yoke center in position for use, Fig. 2, a rear view of the same, Fig. 3, a like view with the neck-yoke below the vehicle pole and ready to be removed therefrom, Fig. 4, a detail sectional view illustrating a modification, Figs. 5, and 6, are perspective views of certain details of construction.

Similar reference numerals are used for the same parts in all the figures.

A neck-yoke 1, has rigidly fastened thereto in a novel manner hereinafter described, a neck-yoke center 2, made of several layers of leather stitched or riveted together and provided with an aperture for the forward end of the pole or tongue, 3 in the usual manner. A crescent or other shaped flange, 4 projects below and at an angle to the pole 3 against which flange the rear side of the neck-yoke center bears.

As heretofore stated the neck-yoke center is made of several layers of leather stitched together in a flat form, the side edges 5 where they pass around the neck-yoke are parallel but broadened at the lower end around the aperture. The upper end 6 of the neck-yoke center is doubled upon itself around a pin or bolt 7 extending a short distance beyond the edges 5 of the neck-yoke center and through enlarged portions 8 of a loop 9. The ends of the pin 7 may be riveted to prevent the disengagement of the loop 9, or, if a bolt be used, nuts will hold the loop on the bolt.

At a suitable point on the front side of the neck-yoke center 2 is a transverse bar 10 with flattened ends 11 projecting beyond the edges of the neck-yoke center, each flattened end having a perforation therethrough. A fold of leather 12, or metal 13, see Fig. 4, surrounds the bar 10 and is riveted or otherwise fastened to the neck-yoke center. By this means the bar 10 is held fixed in position.

The loop 9 extends downwards from the enlargement 8 thereon around the pole or tongue 3 the bend of which reaches a short distance below it. The side members of the loop curve or incline inwardly from their connections to the bar 10 to the lower end of the loop which is semicircular and has about the same radius as the pole or tongue. A short arm 14 projects forwardly from each enlargement 8 and is threaded at its end. The loop 9 and the arms 8 are at obtuse angles to each other so that when the neck-yoke center is fastened to the neck-yoke 1 the loop will assume nearly a perpendicular position and back of the flange 4 when placed on the pole or tongue.

The neck-yoke center 2 is secured on the neck-yoke by folding the straight portion 6 thereof rearwardly around the neck-yoke, passing the arms 14 through the perforations in the flattened ends of the cross bar 10 and screwing nuts 15 on the ends of said arms. By means of the construction described a neck-yoke center is adapted to neck-yokes of various diameters as will be readily understood.

Referring to Fig. 2 it will be noted that the flange 4 is wider than the opening through lower end of the loop 9, thereby preventing the neck-yoke center slipping forward beyond the end of the pole; but when it is desired to remove the neck-yoke, its position is reversed as in Fig. 3, to bring the wider part of the loop opposite the flange 4 which latter can then easily pass through the loop.

What I claim is:

1. A neck-yoke center formed of flexible material having near one end an opening for the reception of a pole and provided at its opposite end with a fold, a cross bar inclosed within the fold and having projecting end portions, a pin extending across the upper portion of the neck-yoke center and fastened thereto, and a pole encircling loop having its ends secured to said pin, there being pivotal connections between the projecting ends of the cross bar and the loop.

2. A neck-yoke center made in flat form, a cross bar attached by a fold of suitable material to the front thereof with flattened and perforated projecting ends, a pin or bolt extending across the upper end of said neck-yoke center and fastened thereto, and a loop mounted on the ends of said pin and fastened thereto, said loop narrowing towards its lower end and having forwardly projecting arms adapted to pass through the perforated ends of said bar and fasten said neck-yoke center to the neck yoke.

3. A neck-yoke center made in flat form and having an aperture in its lower end for a vehicle pole or tongue, a bar attached to the front of said neck-yoke center and having perforated projecting ends, a pin or bolt extending across the upper end of the neck-yoke center and fastened thereto and a loop mounted on the projecting ends of said pin or bolt and fastened thereto and having arms arranged to pass through the perforated ends of said bar when the neck-yoke center is secured on the neck yoke, said loop narrowing towards its lower end and adapted to extend around a pole or tongue behind the bottom flange thereon.

In testimony that I claim the foregoing as my own, I have hereto affixed my signature in the presence of two witnesses.

CHARLES LUKASIEWICZ.

Witnesses:
   J. C. PEDERSEN,
   IGNAC PAWLAWSKI.